(12) United States Patent
Lambert et al.

(10) Patent No.: US 6,442,609 B1
(45) Date of Patent: Aug. 27, 2002

(54) DISTRIBUTED DATA PROCESSING SYSTEM METHOD FOR CONTROLLING SUCH A SYSTEM

(75) Inventors: Howard Shelton Lambert, Southampton; James Ronald Lewis Orchard, Winchester, both of (GB)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/075,589

(22) Filed: May 11, 1998

(30) Foreign Application Priority Data

Jun. 10, 1997 (GB) .............................................. 9711890

(51) Int. Cl.⁷ .............................................. G06F 15/16
(52) U.S. Cl. ................... 709/227; 709/201; 709/203; 709/229; 709/315; 709/101; 707/40; 707/101; 707/103; 707/200; 707/201; 707/202; 705/40; 370/356; 370/358; 370/466; 370/539
(58) Field of Search .................. 709/250, 220, 709/203, 226, 227, 201, 229, 101, 315; 707/101, 103, 200–205, 10; 370/466, 539, 356, 358; 705/40

(56) References Cited

U.S. PATENT DOCUMENTS

| | | | | |
|---|---|---|---|---|
| 4,493,028 A | * | 1/1985 | Heath ........................ 364/200 |
| 5,265,250 A | * | 11/1993 | Andrade et al. ............ 709/101 |
| 5,317,736 A | | 5/1994 | Bowen ........................ 395/600 |
| 5,644,720 A | * | 7/1997 | Boll et al. .................. 709/227 |
| 5,689,708 A | * | 11/1997 | Regnier et al. ............. 709/229 |
| 6,006,229 A | * | 12/1999 | Schmidt et al. .............. 707/10 |
| 6,038,587 A | * | 3/2000 | Phillips et al. .............. 709/101 |
| 6,044,409 A | * | 3/2000 | Lim et al. ................... 709/315 |
| 6,058,120 A | * | 5/2000 | Sabzevari .................... 370/466 |
| 6,061,665 A | * | 5/2000 | Bahreman ..................... 705/40 |
| 6,061,708 A | * | 5/2000 | McKeehan et al. ......... 709/101 |
| 6,115,744 A | * | 9/2000 | Robins et al. ............... 709/227 |
| 6,119,145 A | * | 9/2000 | Ikeda et al. .................. 709/203 |
| 6,151,605 A | * | 11/2000 | Costa .......................... 707/101 |
| 6,178,440 B1 | * | 1/2001 | Foster et al. ................ 709/201 |
| 6,199,110 B1 | * | 3/2001 | Rizvi et al. .................. 709/227 |

FOREIGN PATENT DOCUMENTS

| | | | | |
|---|---|---|---|---|
| EP | 0733971 A2 | * | 9/1966 | ............. G06F/9/46 |
| EP | 0 733 971 A2 | | 9/1996 | ............. G06F/9/46 |

* cited by examiner

Primary Examiner—David Wiley
Assistant Examiner—Oanh L Duong
(74) Attorney, Agent, or Firm—Louis P. Herzberg

(57) ABSTRACT

In a distributed data processing system each component is provided with an object orientated platform together with instantiations of a generic network object for each application involving data transmission, enabling it to run a multiplexing/demultiplexing object appropriate to each application being processed. This effectively provides multiple concurrent data "pipes" over a single physical/logical connection.

12 Claims, 1 Drawing Sheet

DISTRIBUTED DATA PROCESSING SYSTEM METHOD FOR CONTROLLING SUCH A SYSTEM

FIELD OF THE INVENTION

This invention relates generally to distributed data processing systems and more particularly to the control of communication between components of such systems.

BACKGROUND OF THE INVENTION

Access to distributed data processing systems is conventionally obtained by tokens such as plastic cards carrying data in the form of magnetic stripes. Increasingly, active tokens, referred to as smart cards, incorporating data processing and storage facilities, are being used to provide access to more sophisticated facilities such as customer loyalty programs.

Smart cards have been used in various applications including retailing, automatic teller machines (ATM's) and the control of access to pay TV facilities. As the use of such cards increases so does the need for communicating data in a manner appropriate to the transaction. For example, in a retail system using a number of customer transaction tills linked to one or more servers for processing transactions controlled by smart cards it is highly desirable that each smart card application seeking to communicate with a server is connected to a logical data "pipe" which delivers all the data connected with the transaction efficiently and with an appropriate degree of security. In practice it is necessary to use communication links which are already established within a network, which may not be ideally suited to a given application.

SUMMARY OF THE INVENTION

In accordance with the present invention there is provided a distributed data processing system comprising one or more processing terminals arranged for communication over a communication link or links with one or more servers, in which each client processing terminal and each server is adapted to provide an object-oriented processing platform and is responsive to the establishment of a connection over a communication link between a client and a server to transmit a multiplex/demultiplex object to the client or server to which it has been connected which object defines a data multiplexor/demultiplexor to be used during such connection.

According to a second aspect of the invention there is provided a method for controlling communication between the components of a distributed data processing system having one or more client processing terminals arranged for communication over a communication link or links with one or more servers, comprising providing each component with an object orientated processing platform and, in response to the establishment of a connection over a communication link between a client and a server, causing each component involved in the connection to transmit a multiplex/demultiplex object to the other component, which object defines a data multiplexor/demultiplexor to be used during such connection.

There is further provided a method of controlling communication between the components of a distributed data processing system comprising providing each component with an object-oriented processing platform, providing for each application involving data transmission a network object defining a multiplexor/demultiplexor for use in connection with such application, and causing each component, on establishment of a connection with another component in said system in order to perform an application, to transmit the network object associated with such application to said other component to permit said other component to establish a multiplexor/demultiplexor appropriate to the application.

Thus each application running in the system is effectively provided with its own dedicated data transmission channel or "pipe" which provides its own data transmission protocols and the desired degree of security.

In a preferred embodiment of the invention the system provides a generic multiplexor/demultiplexor written in the Java language (Java is a trademark of Sun Microsystems, Inc.). In the preferred system, which provides for transactions initiated or authorised by smart cards, the network objects then run as instances of the multiplexor/demultiplexor, being built into each smart card "applet" which requires data transmission.

BRIEF DESCRIPTION OF THE DRAWINGS

In order that the invention may be well understood, a preferred embodiment thereof will now be described with reference to the accompanying drawings in which.

DETAILED DESCRIPTION OF THE PREFERRED EMBODIMENT

Figure 1:
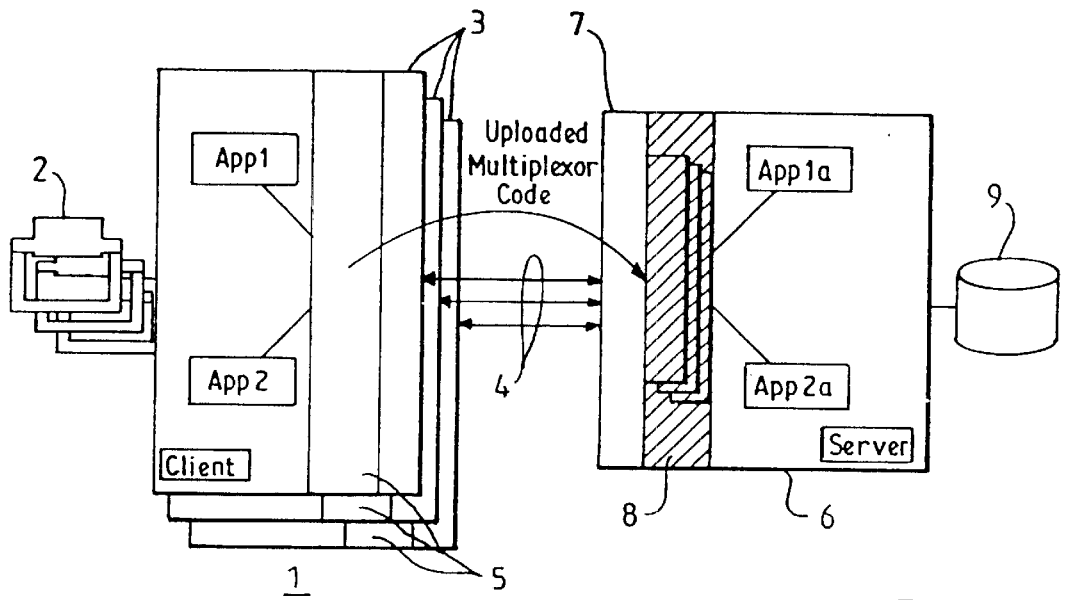
FIG. 1 shows in simplified form a distributed data processing system embodying the invention.

Referring to FIG. 1, there is shown in simplified form a retail transaction processing system embodying the invention. A client station, in the present embodiment a till 1 is attached to a transaction processing terminal 2 incorporating a card reader and is equipped to perform various applications depending on the transaction performed. For example the transaction may be a straightforward cash transaction, or a more complex credit card transaction involving the updating of a customer's credit of loyalty points as well as the debiting of the credit card account. In the case of a cash transaction the amount of data involved may be small. For the credit card transaction however more data is generally involved including the exchange of validation data, some of which is confidential. Thus the client station includes a library of application objects appropriate to each type of transaction (App1, 2 . . . ). The card presented to the terminal 2 may also include stored objects which the client station 1 may access.

The client station includes a communications stack 3, for providing signals over a communications link 4 to the remainder of the network, for receiving signals over the link 4, and translating them into a form usable by the client station. In order to enable a number of applications to be handled simultaneously a software multiplexor/demultiplexor 5 is provided to control the exchange of data between the communications stack and the applications in such a way that each application "sees" its own channel on the communications link 4.

A server station 6 is similarly provided with a communications stack 7, and a multiplexor/demultiplexor 8, and also includes an application object library for the various applications to be processed. Typically this will include applications which may be running on terminals other than the single terminal 1, illustrated in FIG. 1. Server 6 also has an associated storage unit 9 holding among other things customer related data such as details of credit available and password information.

In the preferred embodiment both the client station 1 and the server 6 are configured to provide platforms for performing application objects or "applets" written in the interpretative object orientated language known as Java, and the various multiplexing/demultiplexing objects are accordingly written in that language. This configuration is conventionally achieved by establishing a Java language interpreter in the general purpose processors serving these components.

Figure 2:
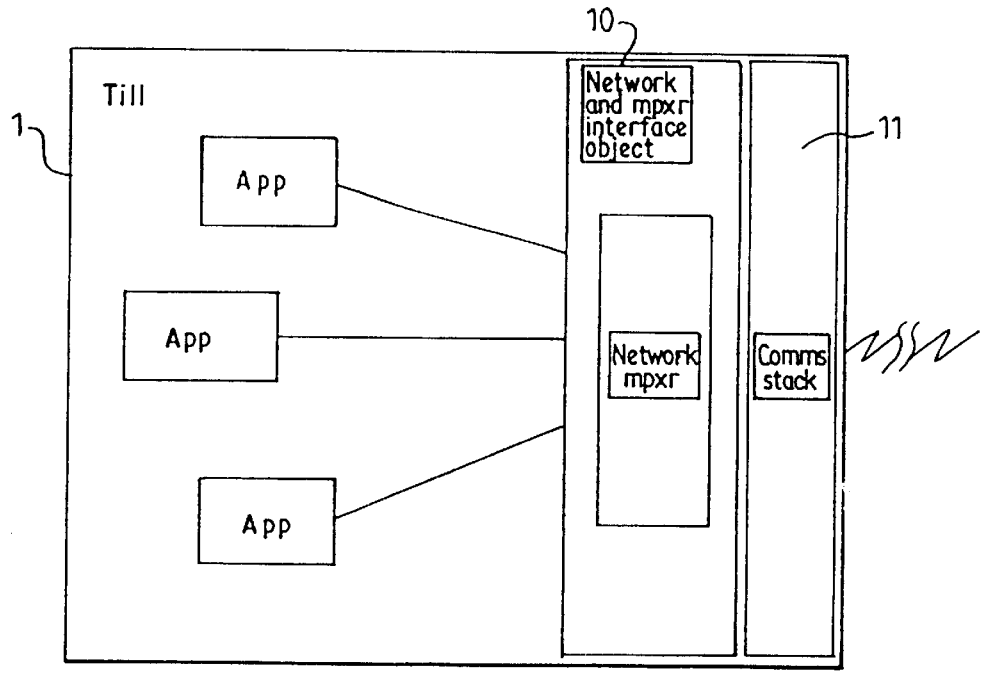
FIG. 2 shows the client station of FIG. 1, in the form of a transaction processing till in a retail environment.

FIG. 2 shows the client station 1, with a network and multiplexor interface object 10, arranged to funnel data from a number of applets through the communications stack 11. The applets will typically be associated with smart card transactions running in a till and each applet that involves data transmission has built into it an instantiation of the network object appropriate to its data transfer requirements. The network and multiplexor interface object 10 has embedded within it the multiplexor objects and methods necessary to process the applets.

When the till and server connect, part of the sign on process involves sending the Java class file that defines the process of multiplexing and demultiplexing the data that will be transmitted over the communication link. The till sends to the server the Java object to be used to demultiplex its data streams, and the server similarly sends to the till its Java object to demultiplex the server data streams. Once this has happened the applets in the till and the server can exchange data in a form that each can understand. The objects exchanged will also typically transmit the type of decryption, if any, to be used, but not necessarily the decryption algorithm.

Thus when a transaction is initiated, for example when a customer or retail assistant is signed on, the correct version of the multiplexor/demultiplexor code is established in the till and the server and is used to control the transmission of data for the duration of the transaction.

In a typical installation there will be a number of tills connected to a server, not all of which are of the same type or from the same manufacturer. By including the appropriate objects in the application object libraries the system can be equipped to cope dynamically with new types of till as they are added.

It will further be appreciated that the function of the application objects is not necessarily restricted to multiplexing and demultiplexing. They can for example be used to control encryption and decryption of data transmitted over the communication link 4, with provision for different types of encryption and decryption.

What is claimed is:

1. A distributed data processing system comprising one or more client processing terminals arranged for communication over a communication link or links with one or more servers, in which each client processing terminal and each server is adapted to provide an object-oriented processing platform and is responsive to the establishment of a connection over a communication link between a client and a server for at least one of the client and server to transmit a multiplex/demultiplex object to the other to which it has been connected which object defines a data multiplexor/demultiplexor to be used by the other to demultiplex messages sent to it during such connection by the sender of the multiplex/demultiplex object.

2. A system as claimed in claim 1 in which each client terminal and server includes a generic object-oriented multiplexer/demultiplexer and one or more application objects each including an instance of said multiplexer/demultiplexer.

3. A method for controlling communication between the components of a distributed data processing system having one or more client processing terminals arranged for communication over a communication link or links with one or more servers, comprising providing each component with an object-oriented processing platform and, in response to the establishment of a connection over a communication link between a client and a server, causing each component involved in the connection to transmit a multiplex/demultiplex object to the other component, which object defines a data multiplexor/demultiplexor to be used by the other to demultiplex messages sent during such connection by the sender of the multiplex/demultiplex object.

4. A method as claimed in claim 3 including providing each client terminal and server with a generic object-orientated multiplexer/demultiplexer and one or more application objects each including an instance of said multiplexer/demultiplexer.

5. A method of controlling communication between the components of a distributed data processing system comprising providing each component with an object-oriented processing platform, providing for each application involving data transmission a network object defining a multiplexor/demultiplexor for use in connection with such application, and causing each component, on establishment of a connection with another component in said system in order to perform an application, to transmit the network object associated with such application to said another component to permit said another component to establish a multiplexor/demultiplexor appropriate to demultiplex messages from each component during the application.

6. A data processing system comprising a first system for communicating with other data processing systems in a network, the system including:

means for establishing a communication link between said first system and a second data processing system;

means for transmitting a demultiplexor object from said first system to said second system;

means for transmitting a multiplexed data stream associated with said demuliplexor object from said first system to said second system;

means for receiving from said second system, or another system within said network, a demultiplexor object for demultiplexing an associated data stream received from such second or other system; and means for using such received demultiplexor object to demultiplex a received data stream.

7. A data processing system according to claim 6, wherein said means for transmitting a demultiplexor object is adapted to send a decryption key within, or together with, said demultiplexor object, the first system including means for encrypting a data stream prior to transmission.

8. A method for communicating between a first data processing system and a second data processing system within a data processing network, each of said first and second systems implementing an object oriented processing platform, the method comprising:

establishing a communication link between the first and second systems;

transmitting a demultiplexor object from the first system to the second system;

transmitting a multiplexed data stream associated with said demuliplexor object from the first system to the second system; and using said demultiplexor object at the second system to demultiplex said multiplexed data stream.

9. A method according to claim 8 wherein said demultiplexor object includes a decryption key for use at the second system for decrypting an encrypted transmitted data stream.

10. A distributed data processing system according to claim 1, wherein said demultiplexor objects include a decryption key.

11. A method according to claim 3, wherein said demultiplexor object includes a decryption key for use at the other component for decrypting an encrypted transmitted data stream.

12. A method according to claim 5, wherein said demultiplexor object includes a decryption key for use at the another object for decrypting an encrypted transmitted data stream.

* * * * *